Oct. 3, 1967 P. T. HERBST 3,344,987

INTERLOCK FOR A METERING AND RECORDING UNIT

Filed March 2, 1966 3 Sheets-Sheet 1

INVENTOR
PAUL T. HERBST
BY
Andrus & Starke
ATTORNEYS

Oct. 3, 1967 P. T. HERBST 3,344,987

INTERLOCK FOR A METERING AND RECORDING UNIT

Filed March 2, 1966 3 Sheets-Sheet 2

INVENTOR
PAUL T. HERBST
BY
Andrus & Starke
ATTORNEYS

Oct. 3, 1967 P. T. HERBST 3,344,987

INTERLOCK FOR A METERING AND RECORDING UNIT

Filed March 2, 1966 3 Sheets-Sheet 3

INVENTOR
PAUL T. HERBST
BY
Andrus & Starke
ATTORNEYS 3,344,987
INTERLOCK FOR A METERING AND RECORDING UNIT Paul T. Herbst, Erie, Pa., assignor to A. O. Smith Corporation, Milwaukee, Wis., a corporation of New York Filed Mar. 2, 1966, Ser. No. 531,194
3 Claims. (Cl. 235—94)

ABSTRACT OF THE DISCLOSURE

A conventional gasoline pump has a ticket printer mounted to the top of the pump. A drive mechanism interconnects an output shaft of the computer to the printer to correspondingly drive the printer in response to dispensing of gasoline. The printer includes an operating handle for printing a reading on a ticket inserted in a tray structure. The tray structure is connected to the operating handle and moved between a first or standby position and a second or recording position in response to the movement of the crank or operating crank. The dispensing pump includes the computer which is reset by rotation of a shaft. An abutment is secured to the shaft and projects therefrom. A link extends between the abutment and a pin on the side of the tray and is pivotally mounted intermediate its length within the dispensing pump. The upper end of the link is formed as a yoke member mating with the pin. With the tray in the standby position, the lower end of the link is free and clear of the abutment. With the tray structure moved forwardly to the recording position, the lower end of the link is disposed in the path of the abutment to prevent rotation of the shaft and resetting of the computer.

This invention relates to a metering and recording unit and more particularly to an interlock for simultaneously metering and recording the dispensing of gasoline or other liquids through a conventional gasoline dispensing unit while providing an individual permanent record of each transaction.

The present invention is particularly applicable to retail gasoline dispensing systems for trucks and similar vehicles where the truck drivers require a printed receipt of the gasoline purchased. In order to provide an automatic printed receipt, a printer mechanism is interconnected to the computer mechanism of the gasoline dispensing unit so that the printer will be automatically driven in accordance with the computer mechanism of the gasoline dispensing unit. Although combined meter register and ticket printers are available, they normally have separate operating and resetting mechanisms.

The present invention is directed to an improved system for combining a printer mechanism with a conventional gasoline dispensing unit or the like and is particularly directed to an interlock mechanism which acts to lock the computer reset shaft when a ticket is inserted in the printer unit so that the computer cannot be reset until the ticket is printed with the final amount of the dispensed gasoline. The present invention thus provides for the normal manual operation of the computer reset shaft if a receipt is not desired and a ticket is not inserted within the printer unit. However, if a receipt for the purchase is required and a ticket is inserted within the printer unit, the interlock mechanism acts to lock the computer reset shaft so that the shaft cannot be reset until the ticket has been finally printed.

More specifically, the printer unit is provided with a rotating or revolving reset hand crank. By rotating the crank through one complete revolution the printer is reset to zero and the ticket or card which is inserted within the printer unit is impressed with the initial or zero reading. During the initial portion of the revoluton of the crank, the printing tray which carries the ticket is moved to a forward position. According to the invention, the tray is connected by an interlock mechanism to the reset shaft of the computer so that forward movement of the tray will act through the interlock mechanism to lock the computer reset shaft against rotation. More specifically, the interlock mechanism includes an arm which is pivotally connected to the frame of the unit. The upper end of the arm is connected to the tray while the lower end of the arm is provided with a hook. When the tray is moved forwardly during the initial revolution of the crank, the arm is pivoted to bring the hook into engagement with an abutment on the computer reset shaft to thereby prevent the shaft from being rotated.

After the dispensing of the gasoline has been completed, the crank on the printer unit is again rotated to print the final amount on the ticket and to return the tray to its original position. Moving the tray to its original position pivots the arm in the opposite direction which moves the hook out of engagement with the abutment on the shaft to thereby release the reset shaft so that it can be manually rotated for resetting the computer.

The interlock mechanism of the invention is only operable when a ticket is inserted in the printer unit and the crank is rotated. If no receipt is required and no ticket is inserted within the printer unit the interlock mechanism is inoperable so that the computer reset shaft can be actuated normally. However, if a receipt is requested and a ticket is inserted within the printer unit the interlock mechanism is then actuated by rotation of the crank to lock the reset shaft against rotation until the final amount has been printed on the ticket.

Other objects and advantages will appear in the course of the following description.

The drawings illustrate the best mode presently contemplated of carrying out the invention.

Figure 1:
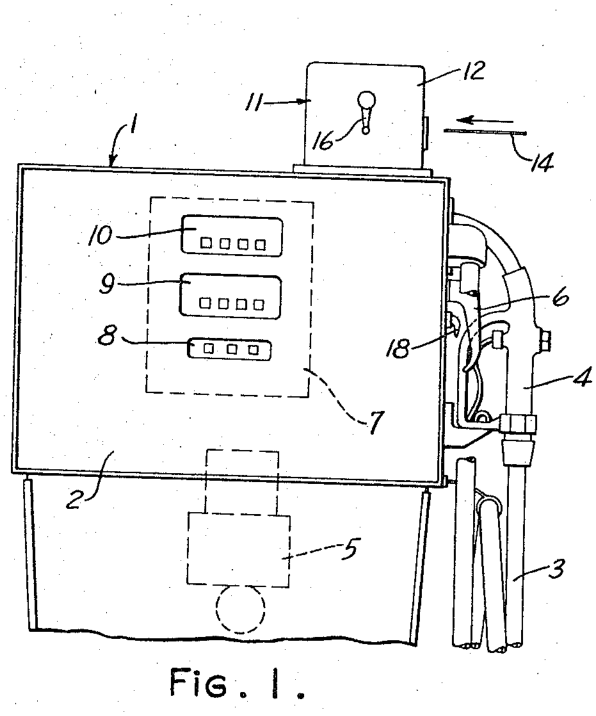
FIGURE 1 is a fragmentary front elevational view of a conventional dispensing pump and printer unit.
Figure 2:
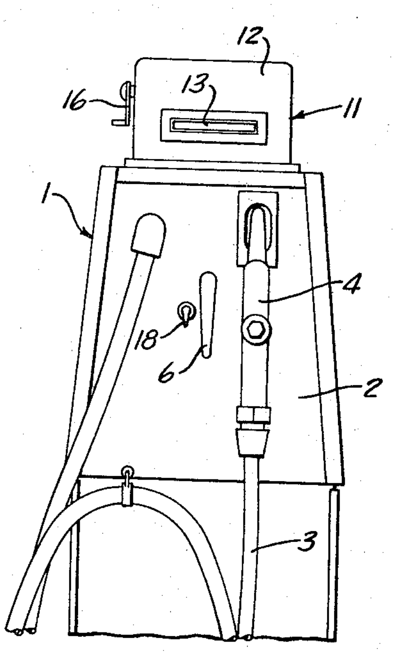
FIG. 2 is a fragmentary side elevation of the dispensing pump and printer unit shown in FIG. 1.

Referring to the drawings and particularly to FIGS. 1 and 2, a conventional gasoline dispensing pump 1 is illustrated with the usual outer decorative housing 2. A dispensing hose 3 is interconnected to the pumping mechanism within the housing 2 and terminates in a dispensing nozzle 4 mounted to the side of the pump 1. The hose 3 is connected to draw gasoline from a storage tank, not shown, through a pumping mechanism shown diagrammatically in dotted outline within the housing as at 5 and discharge the gasoline through nozzle 4. An on-off control handle 6 is shown for turning the pump mechanism on and off in any well-known manner. The pump 1 includes a computer unit 7 within the upper portion of the housing 2 providing a visual cost per gallon display 8, a gallonage dispense display 9 and an individual dispensing cost display 10. In accordance with the illustrated embodiment of the present invention, a ticket printer unit 11 is mounted to the top of the dispenser housing 2 within an outer housing 12 sealed to the top of the pump housing 2. A ticket opening or slot 13 is provided in the front of the printer unit 11 for accommodating a ticket or card 14 on which the amount of gasoline sold is to be printed for an individual sale. The printing mechanism 15 which is shown diagrammatically in FIGS. 3 and 4 is coupled to and actuated by a reset and printing crank 16 rotatably mounted to the one side of the housing 12.

The illustrated computer unit 7 and printer 11 may be of any known or suitable construction. Those illustrated herein are well known, commercially available devices and no further description thereof is given other than to clearly describe the operation and functioning of the present invention.

Figures 3, 8:
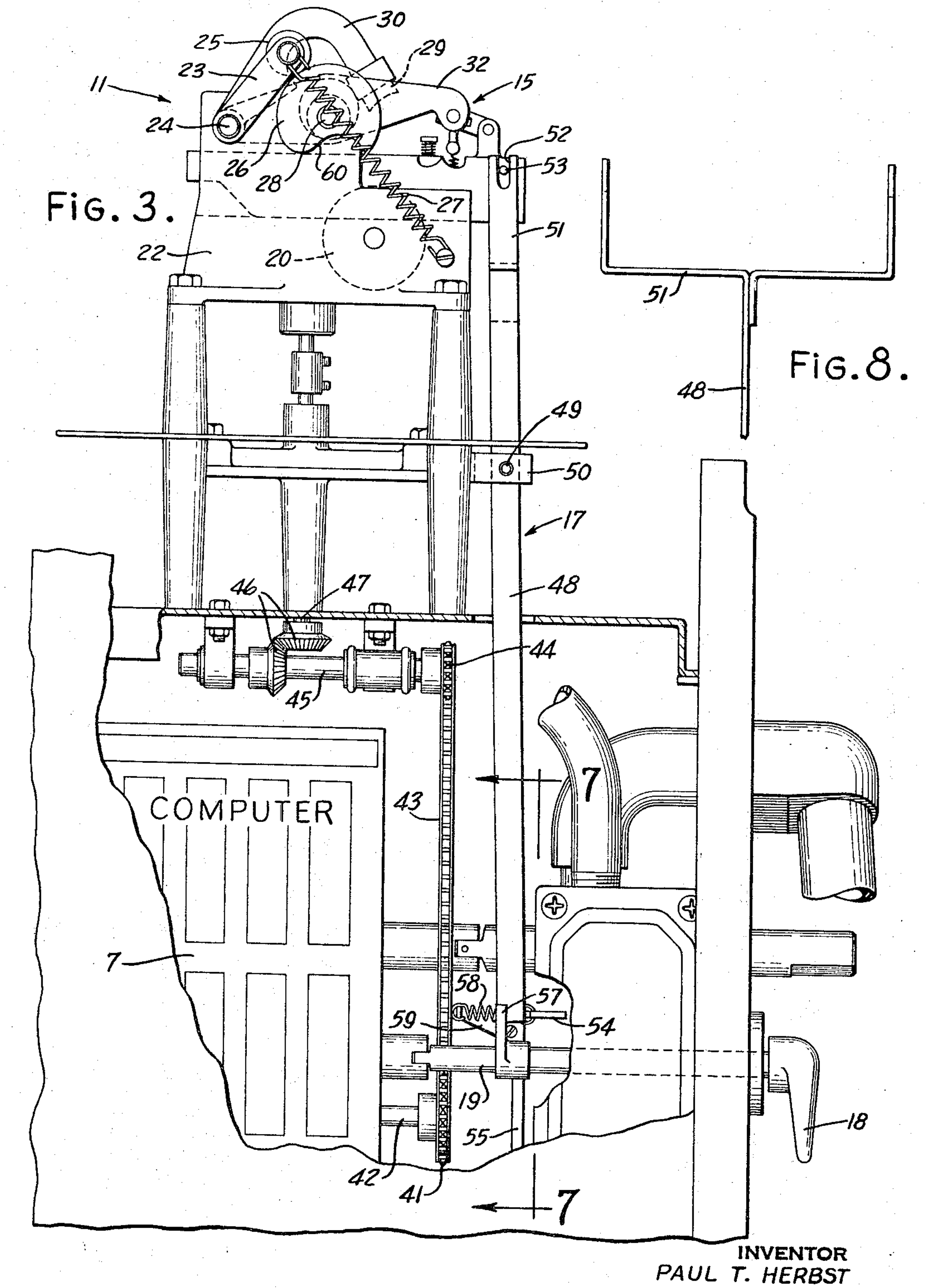
FIG. 3 is an enlarged front elevation with parts broken away in section and showing the printing unit and computer mechanism constructed in accordance with the invention.
FIG. 8 is an end view of the yoke which is attached to the printer tray.
Figure 5:
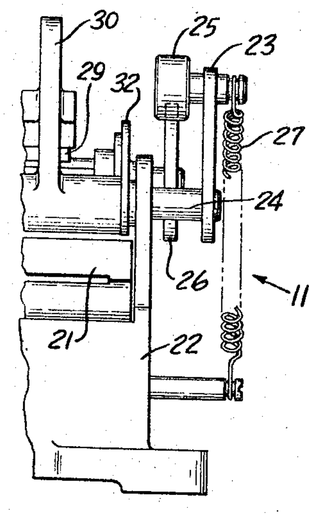
FIG. 5 is a fragmentary side elevation of the printer unit.
Figure 4:
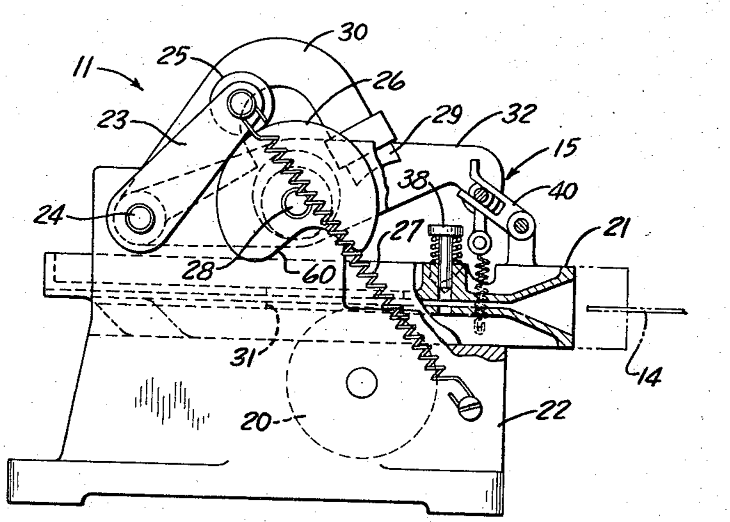
FIG. 4 is a front elevation of the printer unit with parts broken away in section.

Referring particularly to FIG. 3, an interlock coupling unit or mechanism 17 constructed in accordance with the present invention interconnects the computer unit 7 and the duplicating and printing unit 11 to provide the operation generally summarized as follows. The pump mechanism 5 is controlled by the on-off control lever 6 mounted to the one side of the pump housing 2. However, the computer unit 7 includes an interlock switch mechanism, not shown, requiring that computer unit 7 be reset to zero before the movement of the lever 6 will complete the circuit to the pump mechanism.

In accordance with the present invention, if no printed receipt is requested, the computer unit can be reset manually by rotating a handle 18 attached to the computer reset shaft 19. However, if a receipt for the purchase is requested, a ticket is inserted within the printer unit and the crank 16 is rotated through one complete revolution. During the revolution of crank 16, the printer unit is reset and the zero reading is impressed on the ticket or card 14. On resetting the printer unit, the coupling unit 17 acts to lock the reset shaft 19 against rotation so that the computer cannot be manually reset while the ticket 14 is in the printer unit.

After the dispensing of the gasoline is completed, the crank 16 is moved through a second complete revolution during which time the dispensed volume is printed on the ticket or card 14 and the coupling unit 17 is released from engagement with the reset shaft 19 so that the reset shaft can then be manually actuated to reset the computer.

A tray 21 is slidably disposed within a printing frame structure 22, immediately above the printing wheels 20 and includes a central front opening aligned with the slot 13 to receive the card 14. A printing lever 23 is secured to a shaft 24 which is pivotally mounted in the inner end of frame 22. Lever 23 is secured to the one side of the frame 22 and a guide or follower roller 25 is secured to the upper end thereof. The follower roller 25 is urged into positioning engagement with the periphery of a cam 26 by a suitable coil spring 27 which has one end secured to the lever 23 and the opposite end secured to frame 22 by a pin or the like.

Figure 6:
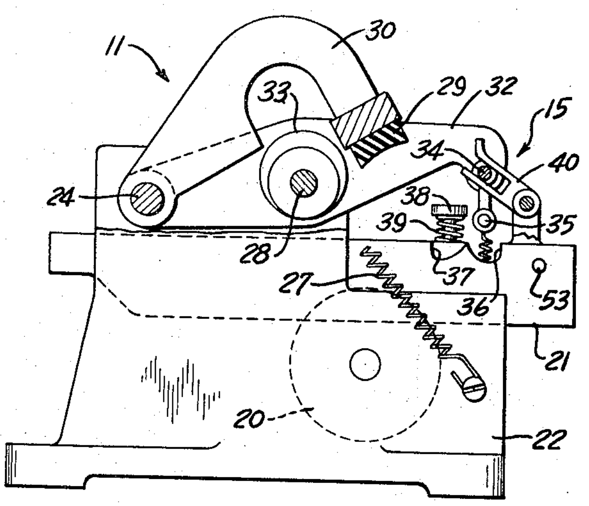
FIG. 6 is a vertical section of the printer unit.

A cam and reset operating shaft 28 is rotatably journaled immediately above the tray 21 within the frame structure 22. The end of the cam shaft 28, opposite from cam 26, projects outwardly of the printer housing 12 with the crank 16 secured thereto. A suitable printing wheel reset mechanism, not shown, couples the shaft 28 to wheels 20 and preferably includes a gear train to reset the wheels upon selected rotation of crank 16; for example, as more fully shown and described in U.S. Patent 2,721,703. Rotation of the crank 16 also rotates the cam 26 with the printing lever 23 and attached shaft 24 oscillating through a selected angle for each revolution of crank 16. A printing platen 29 is carried at the outer end of a pair of arms 30 which are secured to the shaft 24 and pivot therewith such that the rotation of cam 26 permits the spring 27 to rapidly pivot the shaft 24 and the attached arm and moves the printing platen 29 downwardly through an opening 31 in tray 21 and forces card 14 into engagement with wheel 20 to provide an impression of the printing wheels on the card 14. A pair of tray shift arms 32 are pivotally secured at one end to the shaft 24 and each is interconnected through an eccentric cam 33 to the shaft 26, as shown in FIG. 6. The cam 33 is carried by and rotates with the cam shaft 28 to pivot the arms 32 in timed relation to the reset of wheels 20. A tray actuating shaft or arm 34 is pivotally secured to the ends of arms 32, and spring loaded actuating members 35 project downwardly from shaft 34 in alignment with operating recesses having a central deflection point in the top of tray 21 defining forward and rearward actuating shoulders 36 and 37. The initial rotation of the crank 16, shaft 28 and cam 33 pivots arms 32 to drop members 35 into the recesses forwardly of the deflection point and therefore into engagement with forward shoulders 36. This moves tray 21 outwardly to a printing position where it is held until a second rotation of crank 16 returns the tray to the retracted position. During the second cycle, the deflection point is located forwardly of the members 35 such that the members move rearwardly into engagement with shoulders 37 and return the tray 21 to the starting position.

A locking pin 38 is slidably disposed within a vertical opening in the forward portion of the tray 21 with a spring 39 urging the pin upwardly out of the path of the card 14. A U-shaped crank 40 is pivotally mounted on the tray 21 and mates with the shaft arm 34. The movement of the shaft arm 34 pivots the crank 16 and depresses the locking pin 38 into locking engagement with the card 14. The second revolution of the crank 16 lifts the locking pin 38 to release the card 14.

The computer unit 7 may be of any suitable or known construction in which the reset shaft 19 is mounted for oscillatory movement and coupled to reset the counter wheels of the computer mechanism. For example, United States Patents 2,836,363 and 2,869,791 disclose computer reset mechanisms having reset shafts which function as noted above.

Figure 7:
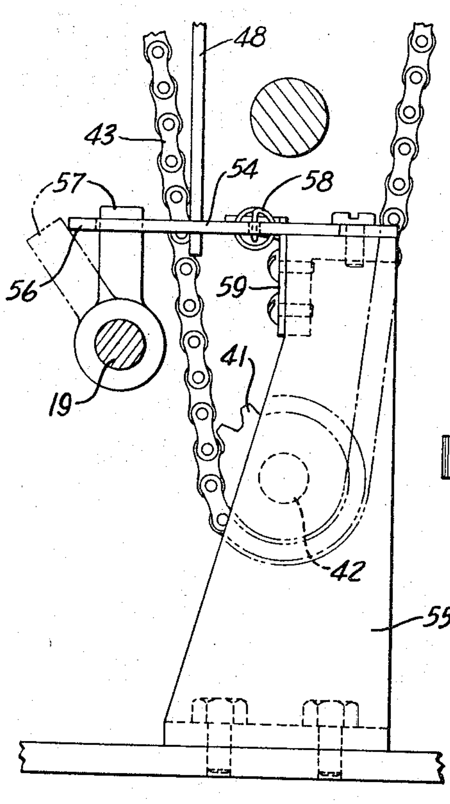
FIG. 7 is a vertical section taken along line 7—7 of FIG. 3.

As previously noted, the computer unit 7 and printer unit 11 are simultaneously driven and any suitable drive mechanism can be employed such as that described in the copending application assigned to a common assignee, Ser. No. 406,776, now Patent No. 3,313,453, filed Oct. 27, 1964, and entitled Metering and Recording Interlock Unit. In this drive system, a drive sprocket 41 is fixed to the quantity drive shaft 42 which is driven by the meter of the dispensing pump 1, as best shown in FIGS. 3 and 7. Sprocket 41 is connected by a chain drive 43 to a sprocket 44 carried by a shaft 45 and rotation of the shaft 45 acts through beveled gears 46 to drive the quantity drive shaft 47 of the printer unit 11 such that similar records of the dispensed liquid are recorded by the computer 7 and the printer unit 11.

As previously noted the interlock or coupling unit 17 acts to prevent rotation of the reset shaft 19 after the printer unit has been initially reset. The interlock unit 17 includes an arm 48 pivotally connected by pin 49 to a bracket 50 which extends outwardly from the frame 22 of the unit. The upper end of arm 48 defines a yoke 51 which is pivotally connected to the tray 21 of the printer unit 11. In this regard each leg of the yoke is provided with a slot 52 and pins 53 extending outwardly from the side walls of the tray are received within the slots. With this connection, the yoke 51 will pivot around the pins 53 as the tray 21 moves in a reciprocating path.

Figure 10:
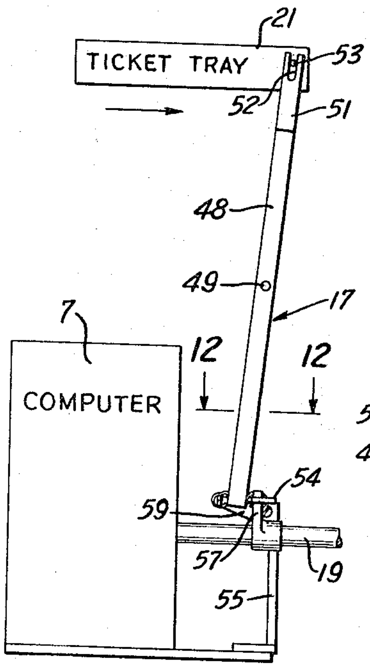
FIG. 10 is a diagrammatic view of the interlock mechanism in the locked position.
Figure 12:
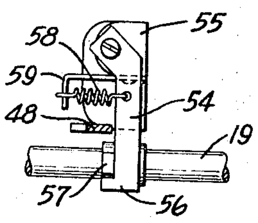
FIG. 12 is a view taken along line 12—12 of FIG. 10.

Pivotal movement of the lower end of arm 48 is adapted to pivot a locking member 54 which is pivotally mounted to the top of a pedestal or base 55. The outer end of locking member 54 defines a hook 56 adapted to be engaged with an upstanding ear or abutment 57 on the reset shaft 19. Locking member 54 is biased toward the abutment 57 by a coil spring 58 connected between member 54 and a bracket 59 extending outwardly from pedestal 55. As the printing tray 21 is moved forwardly, or to the right as shown in FIG. 10, the arm 48 pivots around pin 49 to move the lower end of the arm to the left. This results in spring 58 moving the hook 56 into engagement with the abutment 57 as shown in FIGS. 10 and 12 so that the reset shaft 19 is prevented from rotating while the tray 21 is in the forward position.

Figure 9:
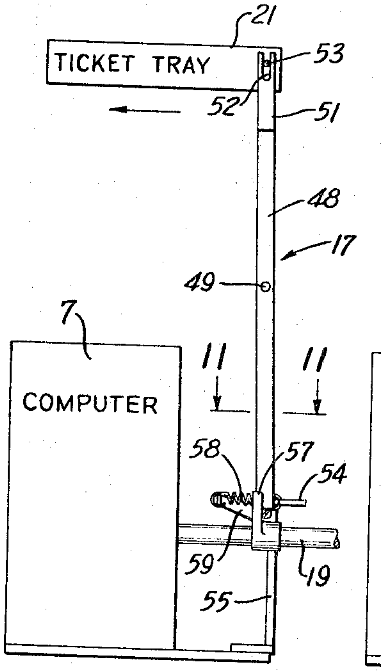
FIG. 9 is a diagrammatic view of the interlock mechanism in the unlocked position.
Figure 11:
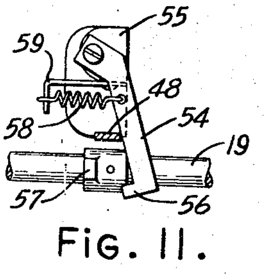
FIG. 11 is a view taken along line 11—11 of FIG. 9.

After the gasoline has been dispensed and the crank 16 is moved through its second revolution, the tray 21 is returned to its original position, thereby pivoting the lower end of the arm 48 to the right, as shown in FIG. 9, to move the hook 56 out of engagement with the ear 57. With the hook in this position, as shown in FIG. 11, the reset shaft 19 can be manually operated to reset the computer mechanism.

In accordance with the invention, the interlock unit 17 is not operable unless the printer unit 11 has been initially reset through the rotation of crank 16. Thus, if a receipt is not required for a purchase, the printer unit 11 is not utilized and the reset shaft 19 can be operated manually to dispense the gasoline. However, in situations where a receipt is requested, the reset shaft 19 is initially operated to reset the computer mechanism. Following this, the ticket 14 is inserted within the printer unit 11 and the operating crank 16 is rotated in a counterclockwise direction to release the mechanism and then in a clockwise direction through one complete revolution as more fully described in the previously referred to United States patents. This rotates the cam 26 through one complete counterclockwise revolution as viewed in FIG. 3. During initial rotation of the cam 26, lever 23 remains stationary as the cam has a constant radius. During this initial rotation, the tray 21 moves forwardly, to the right as shown in FIGS. 3 and 4, as a result of the pivoting of arms 32 and movement of members 35 into engagement with tray shoulders 36.

Movement of tray 21 to the right pivots the lower end of the arm 48 to the left, as shown in FIG. 10 to thereby bring the hook 56 into engagement with the abutment 57 on reset shaft 19 to prevent the reset shaft from being operated while the tray 21 is in the forward position.

After movement of the tray 21 forwardly, to the right, as shown in FIG. 3, the locking pin 38 is forced downwardly through the ticket or card 14 and locks it within the tray. As cam 26 continues to rotate, follower 25 rides into cam recess 60, thereby pivoting lever 23 in a clockwise direction and rotating shaft 24. Rotation of shaft 24 results in downward movement of the printing platen 29 with the resulting printing of the initial quantity, usually zero, upon the ticket or card 14.

After the desired amount of fuel has been dispensed the printer unit crank 16 is again revolved through a second complete revolution. Initial rotation of shaft 28 rotates the eccentric cam 33 to retract the arms 32 to return tray 21 to its original position and print the final quantity on the card 14, then releasing the pin 38 such that the ticket can be removed. As the tray 21 moves to its original position the arm 48 pivots to move the hook 56 out of engagement with the abutment 57 on the reset shaft 19 thereby releasing the shaft so it can be manually operated to reset the computer for the next volume of gasoline to be dispensed.

The advantage of the invention over conventional interlock units is that the interlock does not prevent the pump from being used in the normal manner if a printed receipt is not required. If a receipt is requested and the ticket is inserted within the printing unit, initial operation of the printing unit crank actuates the interlock mechanism to prevent the reset shaft from being actuated until the final volume has been printed on the ticket.

Various modes of carrying out the invention are contemplated as being within the scope of the following claims particularly pointing out and distinctly claiming the subject matter which is regarded as the invention.

I claim:

1. In a dispensing and recording unit for liquids, a liquid dispensing unit having a resettable computer including a movable reset member, a recorder unit mounted in vertically spaced relation to the computer and adapted to provide a printed receipt of the liquid dispensed for individual transactions, said recorder unit having a ticket receiving tray structure for receiving a receipt ticket and manually operable means operating a printing means to impress a reading upon said ticket and simultaneously moving said tray structure between a first position and a second position, and interlock means having a first arm member connected to said tray structure and moved between a first position and a second position with said tray structure and a second member connected to the movable reset member, said first member in said second position being disposed in interfering relation with the second member for preventing resetting of said computer and in said first position being free and clear of the second member.

2. The unit of claim 1 in which the interlock means comprises a pivotal arm having an intermediate pivotal support and extending in opposite directions from said support with the one end pivotally connected to the tray structure, a hook member pivotally mounted in engagement with the second member, said hook member being disposed in the path of the opposite end of said pivotal arm.

3. The unit of claim 2 in which the reset member is a rotatable shaft and said second member is an abutment fixed to the shaft and arranged to be engaged by said hook member when the tray structure is moved to the second position and said arm includes a yoke mating with a pin attached to said tray.

References Cited

UNITED STATES PATENTS

| | | | |
|---|---|---|---|
| 3,021,032 | 2/1962 | Swank | 222—30 |
| 3,021,982 | 2/1962 | Robinson | 222—30 |
| 3,152,754 | 10/1964 | Rapisarda et al. | 235—58 |

RICHARD B. WILKINSON, *Primary Examiner.*

LAWRENCE R. FRANKLIN, *Assistant Examiner.*